(12) United States Patent
Lin et al.

(10) Patent No.: US 7,719,767 B2
(45) Date of Patent: May 18, 2010

(54) COMPOSITE LIGHT DIVISION DEVICE AND IMAGE APPARATUS USING THE SAME

(75) Inventors: Hui-Hsiung Lin, Hsinchu County (TW); Chi-Hung Lee, Tainan County (TW); Yu-Nan Pao, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 12/400,800

(22) Filed: Mar. 10, 2009

(65) Prior Publication Data

US 2009/0323194 A1 Dec. 31, 2009

(30) Foreign Application Priority Data

Jun. 27, 2008 (TW) .............................. 97124245 A (51) Int. Cl.
*G02B 27/10* (2006.01)
*G02B 27/42* (2006.01)
*G02B 5/18* (2006.01)

(52) U.S. Cl. .................. 359/618; 359/619; 359/621; 359/558; 359/566; 359/569; 385/37; 349/62; 355/67

(58) Field of Classification Search ......... 359/618–625, 359/455, 463, 558, 559, 561–563, 566, 569, 359/571, 599, 741–743, 831; 349/62, 64, 349/87; 438/29, 33, 48, 689; 372/20, 23, 372/50.121, 102; 356/498; 385/31, 37, 131, 385/147
See application file for complete search history.

(56) References Cited

U.S. PATENT DOCUMENTS

| | | | |
|---|---|---|---|
| 3,940,788 A * | 2/1976 | Abe et al. .................... 348/291 |
| 4,026,634 A * | 5/1977 | Fukushima ................. 359/455 |
| 4,255,019 A * | 3/1981 | Knop ........................ 359/569 |
| 4,807,978 A | 2/1989 | Grinberg et al. |
| 5,015,835 A * | 5/1991 | Ohuchida et al. ......... 250/201.5 |
| 5,231,620 A * | 7/1993 | Ohuchida ................ 369/44.14 |
| 5,629,796 A * | 5/1997 | Shanks ....................... 359/463 |
| 5,764,389 A | 6/1998 | Grinberg et al. |
| 5,812,319 A * | 9/1998 | Sonstroem .................. 359/569 |
| 6,229,782 B1 * | 5/2001 | Wang et al. ............. 369/112.08 |
| 6,871,982 B2 * | 3/2005 | Holman et al. .............. 362/331 |
| 7,308,172 B2 * | 12/2007 | Hendriks et al. .............. 385/37 |
| 7,315,419 B2 * | 1/2008 | Taira et al. .................. 359/569 |

(Continued)

FOREIGN PATENT DOCUMENTS

TW M249217 11/2004

*Primary Examiner*—Loha Ben
(74) *Attorney, Agent, or Firm*—Jianq Chyun IP Office (57) ABSTRACT

A composite light dividing device is provided. The composite light dividing device receives a light beam mixed by lights of at least two wavebands. The composite light dividing device includes a refracting/diffracting unit, and a refracting unit. The refracting/diffracting unit is adapted for receiving the light beam and condensing the light beam into a condensed light beam, and dividing the condensed light beam at a deflection direction to obtain the lights of the wavebands. The refracting unit is adapted for deflecting the divided lights of the wavebands for outputting them from a specific direction. The composite light dividing device for example can be used in an image apparatus, and the divided lights of the wavebands can serve as primary color lights of the pixel colors.

21 Claims, 7 Drawing Sheets

U.S. PATENT DOCUMENTS 7,386,205 B2 * 6/2008 Wang et al. .................. 385/37
7,397,616 B2 * 7/2008 Nagai et al. ................. 359/741
7,480,428 B2 * 1/2009 Tien ............................. 385/37
7,520,642 B2 * 4/2009 Holman et al. .............. 362/328

* cited by examiner

COMPOSITE LIGHT DIVISION DEVICE AND IMAGE APPARATUS USING THE SAME

CROSS-REFERENCE TO RELATED APPLICATION

This application claims the priority benefit of Taiwan application serial no. 97124245, filed on Jun. 27, 2008. The entirety of the above-mentioned patent application is hereby incorporated by reference herein and made a part of specification.

BACKGROUND OF THE INVENTION

1. Field of the Invention

The present invention generally relates to a technology for composite light dividing devices and an image apparatus applying the same, and more particularly, to a composite light dividing device adapted for dividing light of multiple wavebands.

2. Description of Related Art

An important function of a typical light dividing device is for example dividing a white light to obtain three color lights, i.e., red (R), green (G), blue (B), or multiple color lights of other colors. The mechanism and structure of the light dividing device may vary in accordance with the used apparatus. Conventionally, the R, G, B color lights can be achieved by color filters (CF) of different colors.

In a flat display, a backlight source is often provided with a liquid crystal spatial light modulator and CFs for achieving full color images. Further, image sensors of digital cameras (DC) also demand CFs for cooperating with color variation calculation to present true colors of the original objects. Moreover, some other larger systems, such as a color video recorder and a rear projection TV, adopt a triple-plate type prism set, a dual plate type prism set, or CFs, for cooperating with a collimating light source to display full color images. When the system adopt CFs, because each painted pixel of each CF presents only one of the R, G, B three primary colors, about two third of the incident white light energy is undesirably absorbed, which lowers the optical efficiency, as well as lifespan of the battery. Further, CFs are featured with very complicated fabrication processing, in which each of the primary colors requires at least one semiconductor yellow light processing, thus has a very high production cost.

Further, U.S. Pat. No. 6,867,828, "Light Guide Apparatus, A Backlight Apparatus and a Liquid Crystal Display Apparatus", and U.S. Pat. No. 7,164,454, "Color Filterless Display Device, Optical Element, and Manufacture", propose to employ a micro-prism array having a specific angle or a variable structure micro-grating array serving as a light dividing device, for dividing the white light. The divided white light will be far-field diffracted in the space and thus the white light is decomposed into the R, G, B three primary color lights. However, such a light dividing device has a complicated fabricating process, and a complex structure, and therefore is difficult to achieve a satisfactory yield and a lower production cost. Further, the decomposed R, G, B three primary color lights are going to be divergent along the diffraction angles, and thus being further divergent after entering the display panel, which causes parasitic light, or ghosting images. Such a light dividing device is not an ideal one in practical application of the display panel. Further, the above conventional designs are incapable of improving the aperture ratio and polarization efficiency.

As such, optical elements are being continuously developed of the purpose of replacing CFs, and producing three primary color lights perpendicularly incident into the liquid crystal layer and corresponding to the display panel pixels, while maintaining a high optical efficiency.

SUMMARY OF THE INVENTION

Accordingly, the present invention is directed to provide composite light dividing device. The composite light dividing device is adapted for dividing an incident light beam into primary color lights, in accordance with wavelength differences between color lights, and providing the primary color lights for an image apparatus.

The present invention provides a composite light dividing device, receiving a light beam mixed by lights of at least two wavebands. The composite light dividing device includes a refracting/diffracting unit, and a refracting unit. The refracting/diffracting unit has a first surface, on which a plurality of micro-lenses are configured for condensing the received light beam into a condensed light beam, and a second surface opposite to the first surface, on which there is a periodical grating structure configured, for respectively diffracting lights of different wavebands so as to divide the lights of the different wavebands in accordance with a grating functional mechanism. Further, the condensed light beam can be split into the different wavebands at a deflection direction. Furthermore, the refracting unit may further include a refracting structure, for deflecting the divided lights of the different wavebands to output from a specific direction.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference counting numbers are used in the drawings and the description to refer to the same or like parts.

The present invention provides a composite light dividing device, adapted for receiving a light beam mixed by lights of at least two wavebands. The composite light dividing device includes a refracting/diffracting unit and a refracting unit. The refracting/diffracting unit has a first surface and a second surface opposite to the first surface. The refracting/diffracting unit is configured with a plurality of micro-lenses on the first surface for condensing the received light beam into a condensed light beam. The refracting/diffracting unit is further configured with a periodic grating structure at the second surface, for dividing the condensed light beam into respective lights of the wavebands at a deflection direction. The periodic grating structure for example is a polygonal structure constituted by a plurality of polygonal micro-lenses. However, the present invention does not restrict the periodic grating structure to be a polygonal structure. Any other similar design presenting similar function can also be used in accordance with the spirit of the present invention. The periodic grating structure is adapted for dividing the condensed light beam incident thereon into light beams of different wavelengths. The light beams are spatially separated according to the wavelengths thereof. Further, the refracting unit includes a refracting structure, for deflecting the lights of different wavebands to output from a certain direction. The refracting structure for example can be a grating structure, a prism structure, or a polygonal structure. The composite light dividing device according to the present invention for example can be used in an image apparatus. The divided lights of the different wavebands can be used as primary color lights of pixel colors.

With respect to the refracting unit of the composite light dividing device according to the present invention, the refracting structure thereof is designed for satisfying Snell's law or the diffraction principle, so that the lights of different wavebands split from the light beam can be outputted from a direction approximately parallel with an incident direction of the light beam. The refracting structure of the refracting unit for example is a polygonal structure constituted by a plurality of polygonal micro-lenses. However, the present invention does not restrict the periodic grating structure to be a polygonal structure. Any other similar design presenting similar function can also be used in accordance with the spirit of the present invention.

The composite light dividing device can also be used together with polarizing materials for a variety of applications, such as serving as CFs for display panels, image sensors, or color video recorders, or applying in illumination systems for controlling color components or energies of light beams for improving light utilization efficiency or simplifying complexity of the original system.

An embodiment is to be given herebelow for exemplifying without restricting the scope of the present invention. Embodiments provided hereby can be mutually combined, or modified one by another as desired.

Taking a white light beam as an example of the incident light beam, the embodiment of the present invention can divide the incident white light beam into a plurality of primary color light in accordance with the system and light source. For example, the incident white light beam is split into three primary color lights, e.g., R, G, B color lights. It should be noted that other primary color lights may also apply in accordance with the practically desired wavebands. According to an aspect of the embodiment, each of the color lights is outputted along a direction substantially parallel with an incident direction of the incident light beam. According to other aspects of the present invention, each of the color lights can be designed as being outputted along a direction substantially configuring an angle with an incident direction of the incident light beam, the angle ranging from 0° to 60°. When applied for a system such as a display panel or a color video recorder, each of the color lights corresponds to a pixel position.

Figure 1:
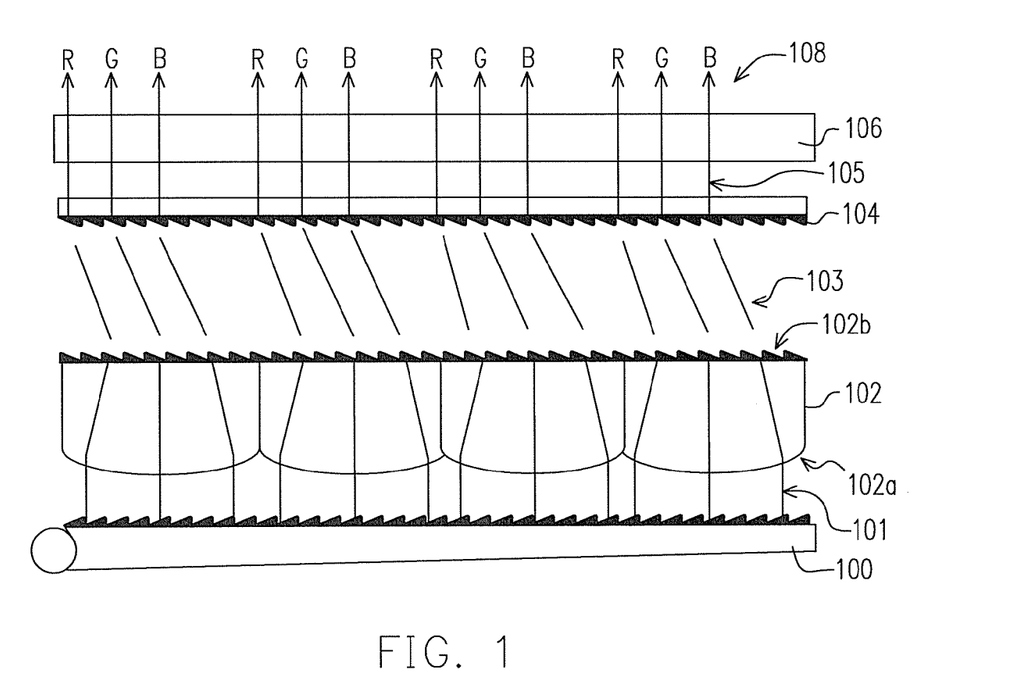
FIG. 1 is a structural cross-sectional view illustrating a flat image display apparatus employing a composite light dividing device according to an embodiment of the present invention.
Figure 2:
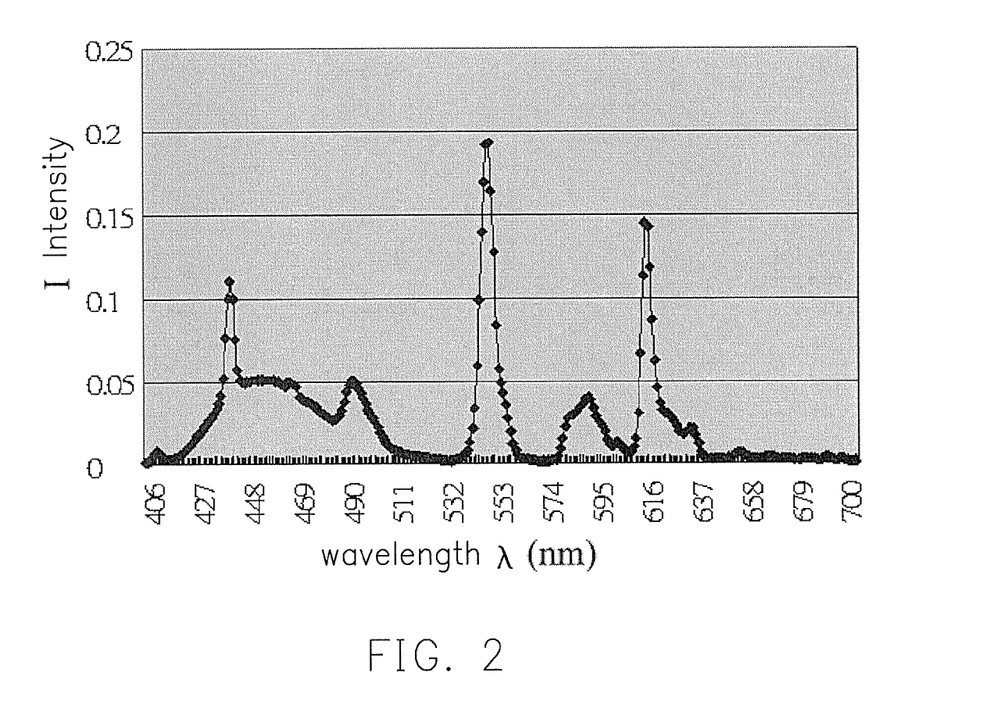
FIG. 2 is a spectrum diagram of a cold cathode fluorescent lamp (CCFL).

FIG. 1 is a structural cross-sectional view illustrating a flat image display apparatus employing a composite light dividing device according to an embodiment of the present invention. Referring to FIG. 1, a flat image display apparatus is taken as an example, in which a backlight module 100 produces a flat light source. The flat light source produced by the backlight module 100 for example is a white light. Such a white light is often generated by R, G, B light emitting diodes (LED), or a light beam including lights of three primary color wavebands emitted by a cold cathode fluorescent lamp (CCFL). FIG. 2 is a spectrum diagram of a CCFL, in which the wavelength range includes major primary color lights, i.e., R (611 nm), G (544 nm), B (436 nm). However, it should be noted that R, G, B are only one kind of typical three primary color lights, and other primary color lights are also applicable in accordance with the present invention.

Further referring to FIG. 1, it shows a display panel 106. The display panel 106 for example is a liquid crystal display panel. The display panel 106 can also be an image panel for capturing images. In other words, the display panel 106 can be an image unit constituted by pixels. In cooperating with pixels of the display panel 106, the flat light source is adapted to narrow a diameter of the light beam in accordance with a desired aperture via the refracting/diffracting unit 102, to configure at least one condensed light beam. Each of the at least one condensed light beam is correspondingly split into a group of lights of wavebands of R, G, B sub-pixels.

The refracting/diffracting unit 102 has a first surface and a second surface which are oppositely configured. The refracting/diffracting unit 102 is configured with a plurality of micro-lenses 102a on the first surface. The refracting/diffracting unit 102 is further configured with a periodic grating structure 102b at the second surface. Each of the micro-lenses 102a is adapted for receiving a light beam 101 of a certain range of the flat light source, and converging the light beam 101 into a condensed light beam. The light beam 101 is condensed by the micro-lens 102a of the first surface of the refracting/diffracting unit 102. Then, the obtained condensed light beam is transmitted to the periodic grating structure 102b. The condensed light beam is then processed by the periodic grating structure 102b, and split into lights of three different wavebands, i.e., R, G, B lights 103 hereby, according to the wavelengths thereof. The R, G, B lights 103 are then deflected by a refracting unit 104 so that the R, G, B lights 103 are refracted and outputted in a direction approximately parallel with an incident direction of the light beam 101. After deflected by and outputted from the refracting unit 104, the R, G, B lights 103 become lights of a plurality of wavebands (each of which is called as a waveband light) 105, and enter a liquid crystal layer of a display panel 106. Liquid crystal molecules in the liquid crystal layer control strength of each waveband light 105. In such a way, each pixel position is provided with color lights 108 respectively.

Figure 3:
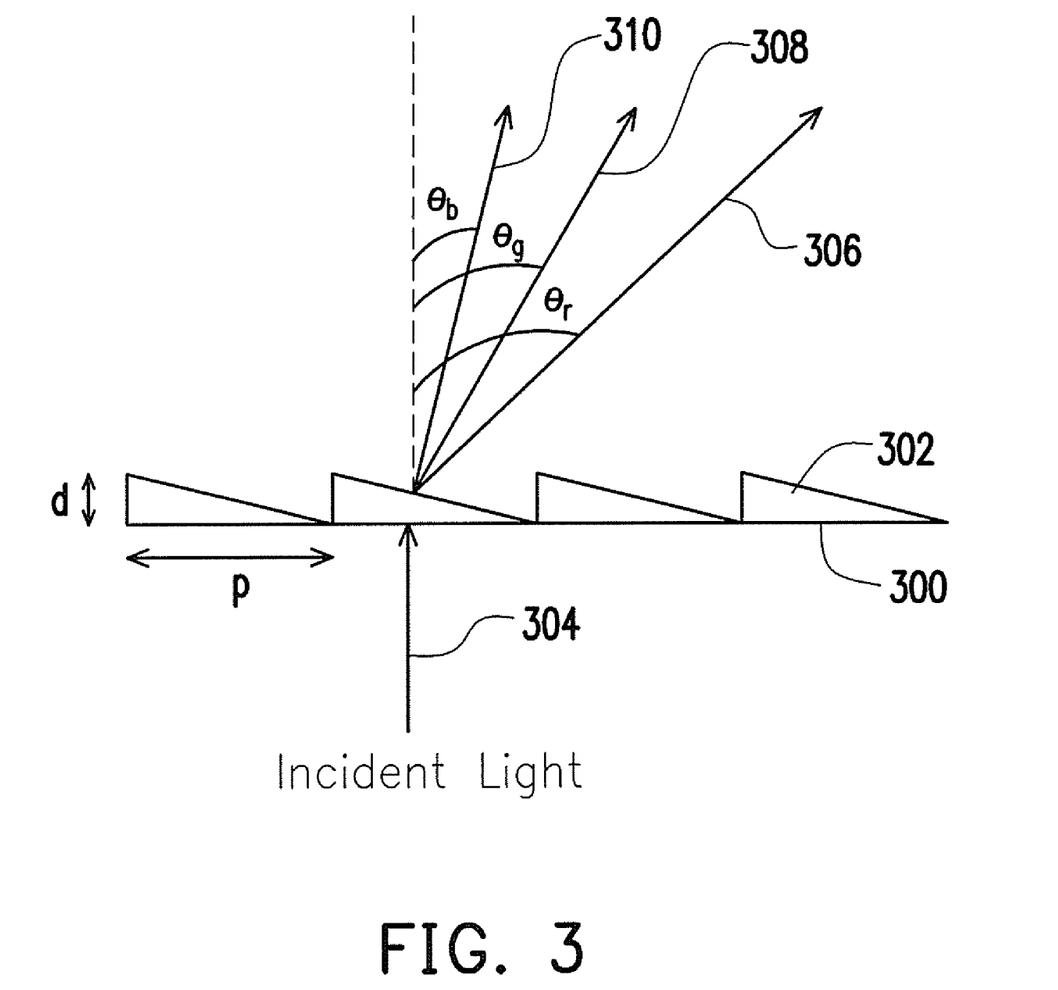
FIG. 3 is a schematic diagram illustrating a grating structure and mechanism according to an embodiment of the present invention.

FIG. 3 is a schematic diagram illustrating a grating structure and mechanism according to an embodiment of the present invention. Referring to FIG. 3, a periodic grating structure 302 configured at the second surface 300 of the refracting/diffracting unit 102 is a periodic wedge-triangular structure. An incident light 304 includes R, G, B three primary color lights. The periodic grating structure 302 is featured with a period p and a structure height d, which defines an angle of the wedge of the wedge-triangular structure. In the current embodiment, wavelengths of R, G, B three primary color lights are respectively represented by $\lambda r$, $\lambda g$, and $\lambda b$.

According to the grating equation, with respect to an m$^{th}$ order of diffraction, the diffraction angles are:

$$\theta_r = \sin^{-1}\frac{m\lambda_r}{p}, \theta_g = \sin^{-1}\frac{m\lambda_g}{p}, \theta_b = \sin^{-1}\frac{m\lambda_b}{p}, \quad (1)$$

in which $\theta_r$, $\theta_g$, $\theta_b$, are related to the angle of the wedge, and the refractive index of the material, which can be modified in application. With respect to the diffraction, each order of diffracted light defines a specific angle with the incident light. Further, wavelength difference of the incident light brings fine distinctions, for example generating red light 306, green light 308, and blue light 310.

Figure 4A:
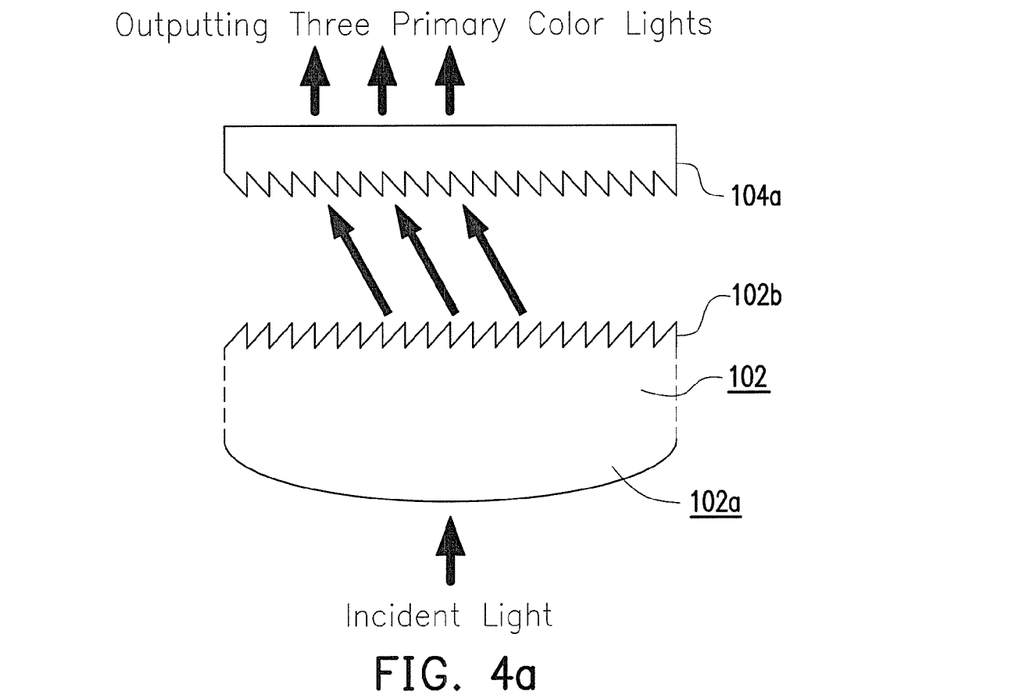
FIGS. 4a through 4e are cross-sectional views and perspective views of a composite light dividing device according to an embodiment of the present invention.
Figure 4B:
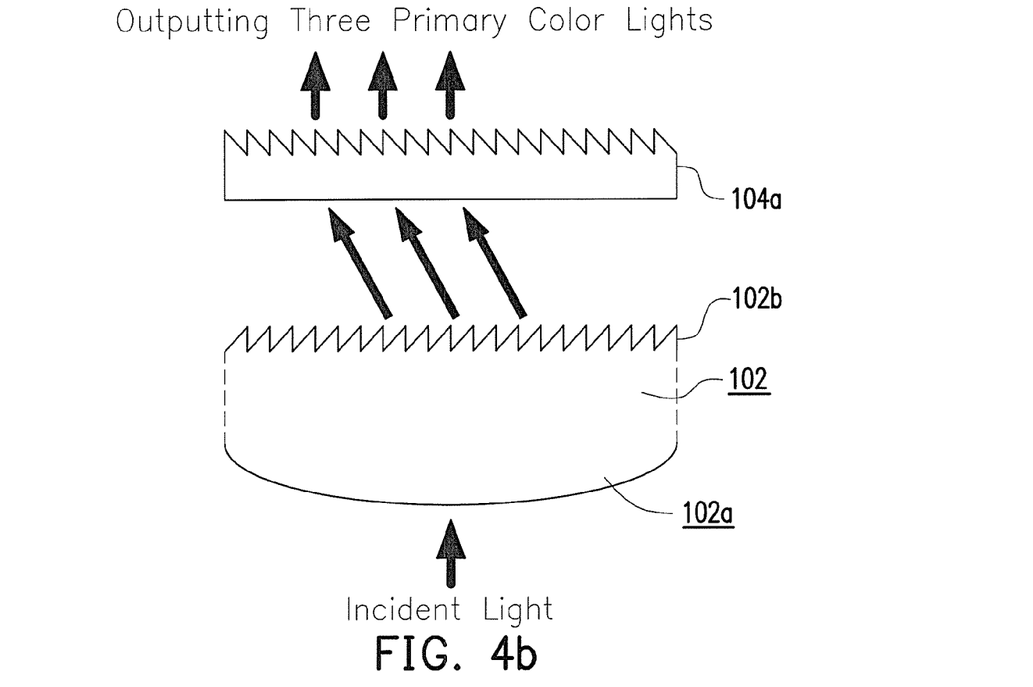

The refracting structure of the refracting unit 104 is adapted to deflect the incident light in accordance with the grating mechanism or the law of refraction of the geometrical optics. Taking the grating mechanism for example, as shown in FIGS. 4a and 4b, an incident light is condensed by the micro-lenses 102a at the first surface of the refracting/diffracting unit 102, to configure a condensed light beam. The condensed light beam is then transmitted to the periodic grating structure 102b at the second surface of the refracting/diffracting unit 102. Being processed by the grating mechanism, the condensed light beam is split into three waveband (R, G, B) lights, 103. The refracting unit 104 is configured with a refracting structure 104a. The refracting structure 104a, for example, is a polygonal grating structure. The polygonal grating structure has a period equivalent with the period of the periodic grating structure 102b at the second surface of the refracting/diffracting unit 102. The polygonal grating structure is configured opposite to the periodic grating structure 102b at the second surface of the refracting/diffracting unit 102. The refracting structure 104a can be configured at an incident end of the refracting unit 104 from where the waveband lights 103 enter the refracting unit 104, as shown in FIG. 4a. Or otherwise, the refracting structure 104a can be configured at an output end of the refracting unit 104 from where the waveband lights 103 are outputted from the refracting unit 104, as shown in FIG. 4b. When the waveband lights 103 of different colors enter the refracting structure 104a of the refracting unit 104, according to the principle of reversibility of light, ideally the waveband lights 103 will be deflected to transmit along a direction parallel with the incident direction of the incident light. In other words, the three waveband lights 103 are parallel with and apart from each other, while maintained perpendicular to the corresponding pixels of the display panel 106. However, in practical application, some errors may occur within an acceptable tolerance range. When applied in a color charge coupled device (CCD) for a DC, or a color video recorder, the principle similarly applies. The only difference therebetween is that the light source is come from outside objects, while other structures are similar. A relative distance from refracting structure 104a of the refracting unit 104 to the periodic grating structure 102b of the refracting/diffracting unit 102 is determined according to the desired resolution (i.e., spacing interval between R, G, B sub-pixels of the LCD panel). The refracting structure 104a and the periodic grating structure 102b can be designed with a same period, and different structures. They can be designed with polygonal grating structures, such as a wedge-triangular structure. Further, when considering the convenience of assembling, the refracting structure 104a and the periodic grating structure 102b can be provided with air or a transparent material layer. In other words, air or a transparent material layer can be provided between the refracting unit 104 and the refracting/diffracting unit 102.

Figure 5A:
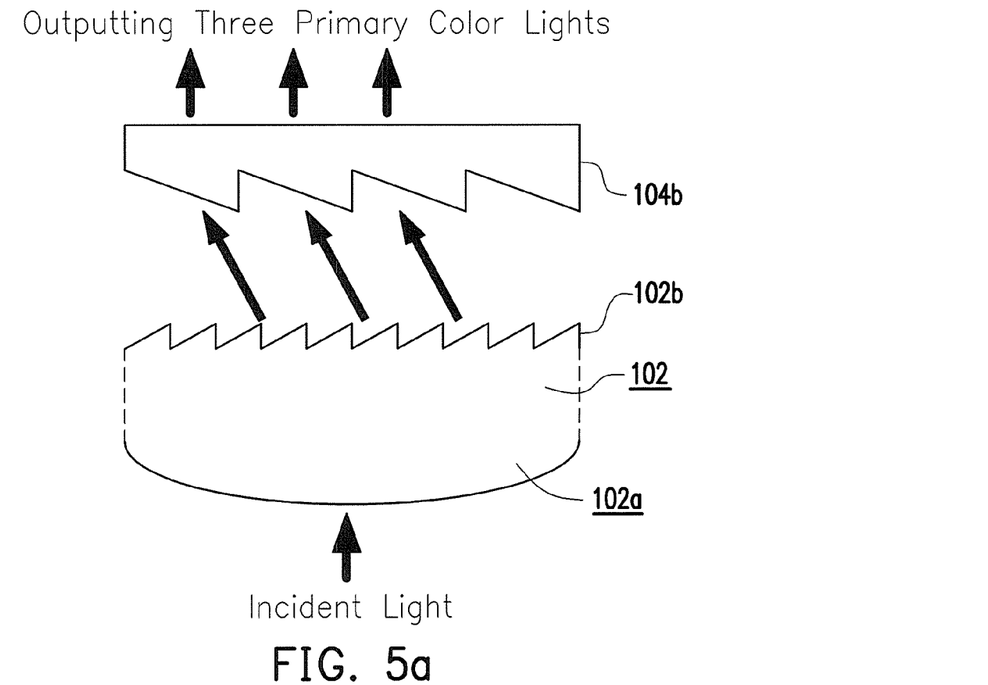
FIGS. 5a through 5c are cross-sectional views and perspective views of a composite light dividing device according to an embodiment of the present invention.
Figure 5B:
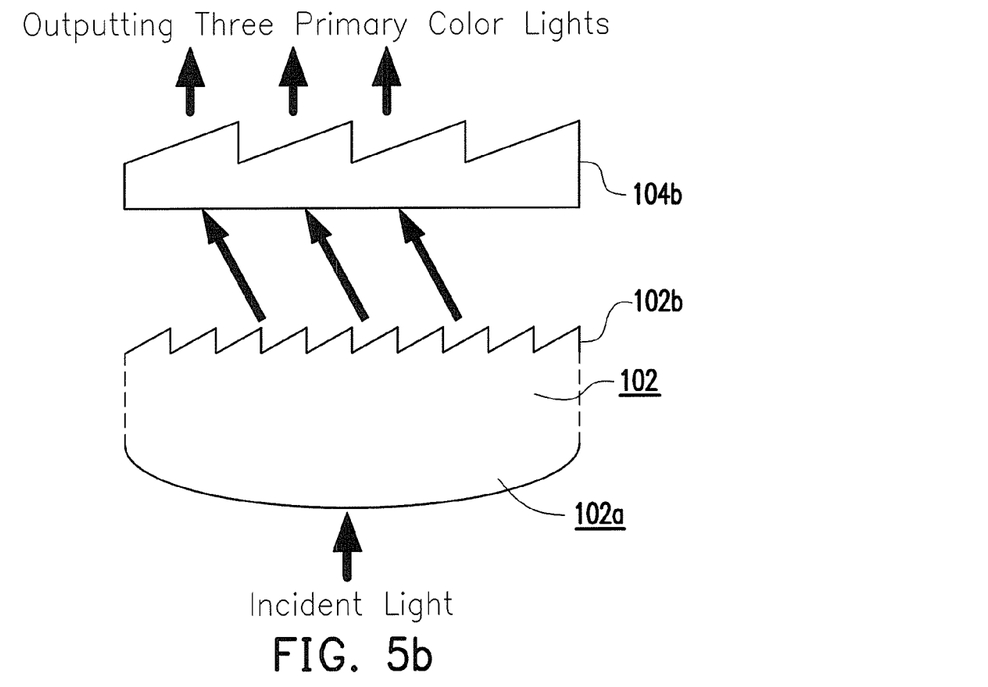

The refracting structure 104a of the refracting unit 104 can also deflect the incident light according to the law of refraction of the geometrical optics. As shown in FIGS. 5a and 5b, an incident light is condensed by the micro-lenses 102a at the first surface of the refracting/diffracting unit 102, to configure a condensed light beam. The condensed light beam is then transmitted to the periodic grating structure 102b at the second surface of the refracting/diffracting unit 102. Being processed by the grating mechanism, the condensed light beam is split into three waveband (R, G, B) lights, 103. The refracting unit 104 is configured with a refracting structure 104b. The refracting structure 104b for example is a polygonal grating structure. A slope rate of the refracting structure 104b can be designed according to the refractive index of the refracting unit 104, and the desired deflection angle. The refracting structure 104b can be configured at an incident end of the refracting unit 104 from where the waveband lights 103 enter the refracting unit 104, as shown in FIG. 5a. Or otherwise, the refracting structure 104b can be configured at an output end of the refracting unit 104 from where the waveband lights 103 are outputted from the refracting unit 104, as shown in FIG. 5b. Finally, after being deflected, the waveband lights 103 are transmitted along a direction parallel with the direction of the incident light. In other words, the three waveband lights 103 are parallel with and apart from each other, while maintained perpendicular to the corresponding pixels of the display panel 106. When applied in a color charge coupled device (CCD) for a DC, or a color video recorder, the principle similarly applies. The only difference therebetween is that the light source is come from outside objects, while other structures are similar. A relative distance from refracting structure 104b of the refracting unit 104 to the periodic grating structure 102b of the refracting/diffracting unit 102 is determined according to the desired resolution (i.e., spacing interval between R, G, B sub-pixels of the LCD panel).

In practical design, the size of each waveband light 103 at the display panel 106 is to be slightly smaller than the size of the sub-pixels of the display panel 106. For example, if the pixel size of the adopted display panel is 219×219 μm$^2$, then the size of the condensed light beam after being condensed by the micro-lenses 102a at the first surface of the refracting/diffracting unit 102 should be split to obtain a size corresponding to the display panel 106 smaller than 219×49.5 μm$^2$. Of course, the size can be designed in accordance with different requirements. Additionally, the refracting/diffracting unit 102 is made of a transparent material. A curvature of the micro-lenses 102a at the first surface is determined by the following factures. 1. Optical refractive indices of the refracting/diffracting unit 102, the refracting unit 104, the display panel 106, and materials disposed therebetween; 2. Thicknesses of the refracting/diffracting unit 102, the refracting unit 104, the display panel 106, and materials disposed therebetween; and 3. Sizes and spacing intervals between sub-pixels such as R, G, and B of the display panel 106.

Figure 6:
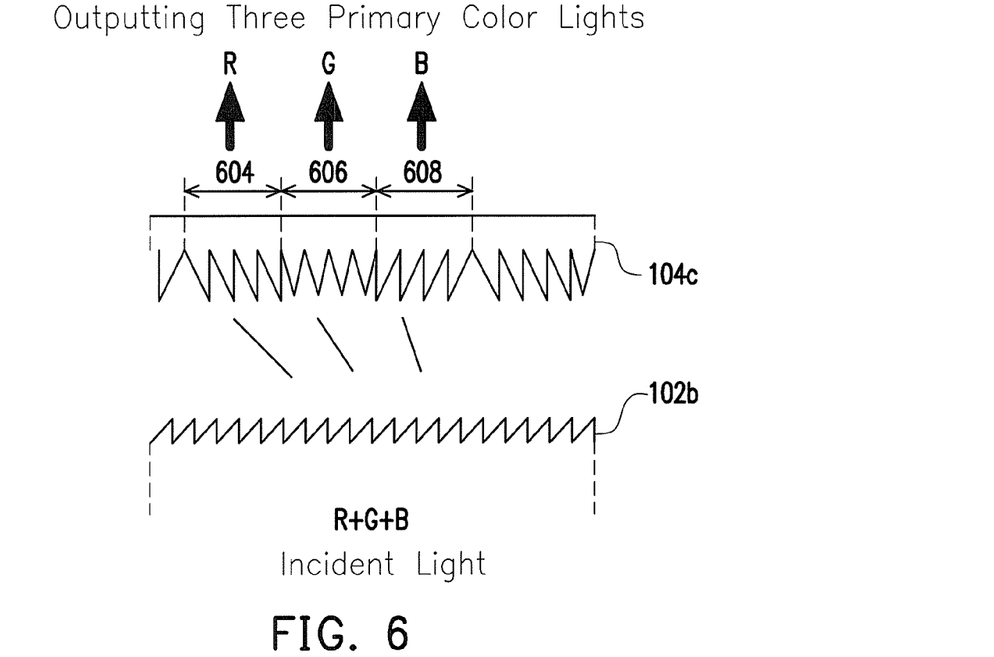
FIG. 6 is a cross-sectional view of a composite light dividing device according to an embodiment of the present invention.

FIG. 6 is a cross-sectional view of a composite light dividing device according to an embodiment of the present invention. When the refracting structure of the refracting unit 104 is a grating structure, the refracting structure further includes a grating sub-structure corresponding to each of the waveband lights. Referring to FIG. 6, a refracting structure 104c of the refracting unit 104 is structurally optimized for further improving a spectrum split light outputting efficiency corresponding to a specific polarizing direction or a specific component of the incident light. For example, the refracting structure 104c includes grating sub-structures 604, 606, and 608 corresponding to regions of R, G, B lights, respectively. And the grating sub-structures 604, 606, and 608 are periodically partially modified in accordance with the incident angles thereof, respectively, so as to improve the light dividing efficiency and partially adjust the light outputting angles. In other words, the periodic grating structure 102*b* at the second surface of the refracting/diffracting unit 102 sustains a light dividing efficiency, while the refracting structure 104*c* of the refracting unit 104 may include refraction sub-structures.

The mechanism of improving the light efficiency is as follows: when passing through the periodic grating structure 102*b* at the second surface of the refracting/diffracting unit 102, the incident light is spectrally split, and the spectrum split lights have different diffraction angles, so that the different waveband lights enter different regions of the refracting structure 104*c* of the refracting unit 104. As such, the different regions can be structurally optimized corresponding to the wavelengths of the lights to be incident thereon. According to an embodiment as below, a light outputting efficiency is estimated as being improved for 5%.

Supposing three wavelengths of the incident light are 436 nm, 544 nm, and 611 nm, as an example. The incident light is incident on the composite light dividing device according to the embodiment of the present invention. The periodic grating structure at the second surface of the refracting/diffracting unit and the refracting structure of the refracting unit are both blazed gratings. The periods of the two structures are all P =4 μm. Depths of the two structure are all d=1.11 μm. Then diffraction efficiencies and diffraction angles of the three waveband lights at a −1 order direction are respectively 71% (6.257°), 84.64% (7.816°), 80.60% (.786°). The average efficiency is 79%. If an average spacing interval of the RGB sub-pixels of the display panel is 73 μm, then the structural distance from the periodic grating structure at the second surface of the refracting/diffracting unit to the refracting structure of the refracting unit should be within the range of 2.645 to 4.222 μm. When the different regions are structurally optimized corresponding to the wavelengths of the lights to be incident thereon, then diffraction efficiencies of the three waveband lights at a −1 order direction are respectively improved to 86.95%, 84.64%, 83%. And the average efficiency is 85%. Therefore, the total efficiency is improved for 5%.

Figure 7:
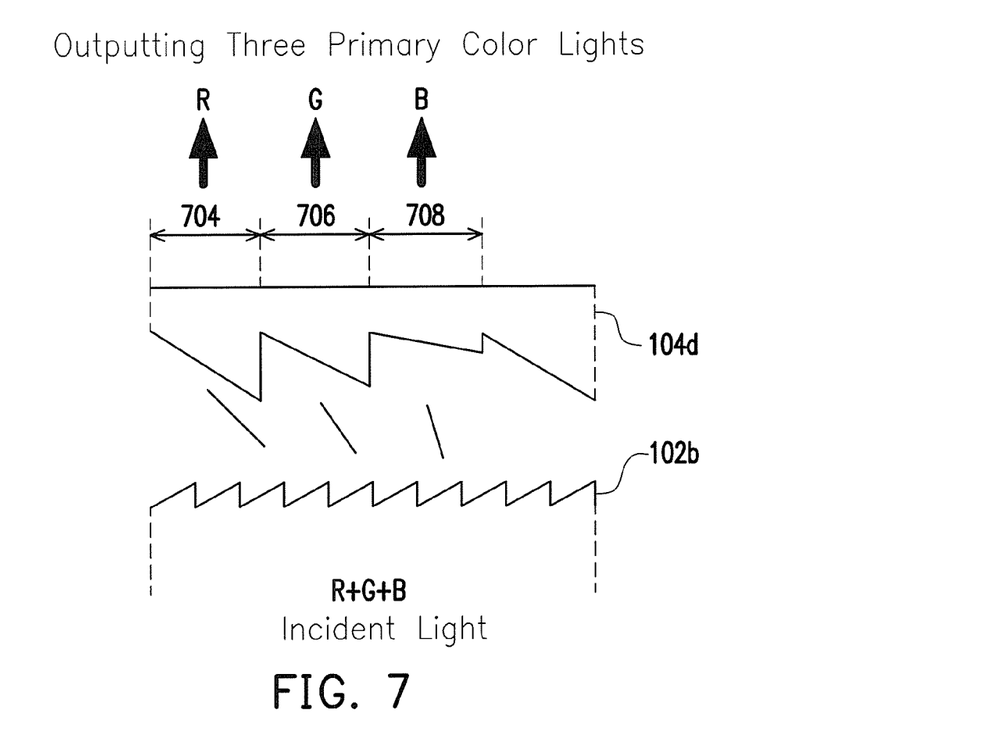
FIG. 7 is a cross-sectional view of a composite light dividing device according to an embodiment of the present invention.

FIG. 7 is a cross-sectional view of a composite light dividing device according to an embodiment of the present invention. According to an embodiment of the present invention, the refracting unit 104 is configured with a refracting structure 104*d*. The refracting structure 104*d* is a polygonal structure further includes a refraction sub-structure in each region corresponding to each of the waveband lights. As shown in FIG. 7, the refracting structure 104*d* is structurally optimized for further improving a spectrum split light outputting efficiency corresponding to a specific polarizing direction or a specific component of the incident light. For example, the refracting structure 104*d* includes geometrical refraction sub-structures 704, 706, and 708 corresponding to regions of R, G, B lights, respectively. And the geometrical refraction sub-structures 704, 706, and 708 are partially modified about the local slope rate in accordance with the incident angles thereof, respectively, so as to improve the light refraction efficiency and partially adjust the light outputting angles. In other words, the periodic grating structure 102*b* at the second surface of the refracting/diffracting unit 102 sustains a light dividing efficiency, while the refracting structure 104*d* of the refracting unit 104 may include refraction sub-structures.

As for the processing technology for realizing the present invention, micro-structures employed in the elements of the present invention for example can be fabricated by ultra precision machining technology, in which a single crystal diamond cutting tool is used in machining a metal mold and the micro optical elements are produced by injection molding.

In summary, the present invention provides a composite light dividing device. The composite light dividing device includes a refracting/diffracting unit and a refracting unit. The refracting/diffracting unit has a first surface, and a second surface opposite to the first surface. The refracting/diffracting unit is configured with a plurality of micro-lenses at the first surface of the refracting/diffracting unit, for condensing a received light beam to obtain a condensed light beam. The refracting/diffracting unit is further configured with a periodic grating structure at the second surface of the refracting/diffracting unit, for dividing the condensed light beam at a deflection direction to obtain a plurality of waveband lights. Further, the refracting unit includes a refracting structure, for deflecting the divided waveband light to output along a specific direction. In other words, the finally outputted waveband lights are outputted from different positions, while the outputting directions thereof are maintained substantially parallel with the incident direction of the incident light. Or otherwise by employing different refracting structure s, each of the waveband lights can be designed as being outputted along a direction substantially configuring an angle with the incident direction of the incident light beam, the angle for example ranging from 0° to 60°.

The composite light dividing device for example can be applied in opto-mechanical systems such as display panels, color video recorders, or DCs.

Figure 4C:
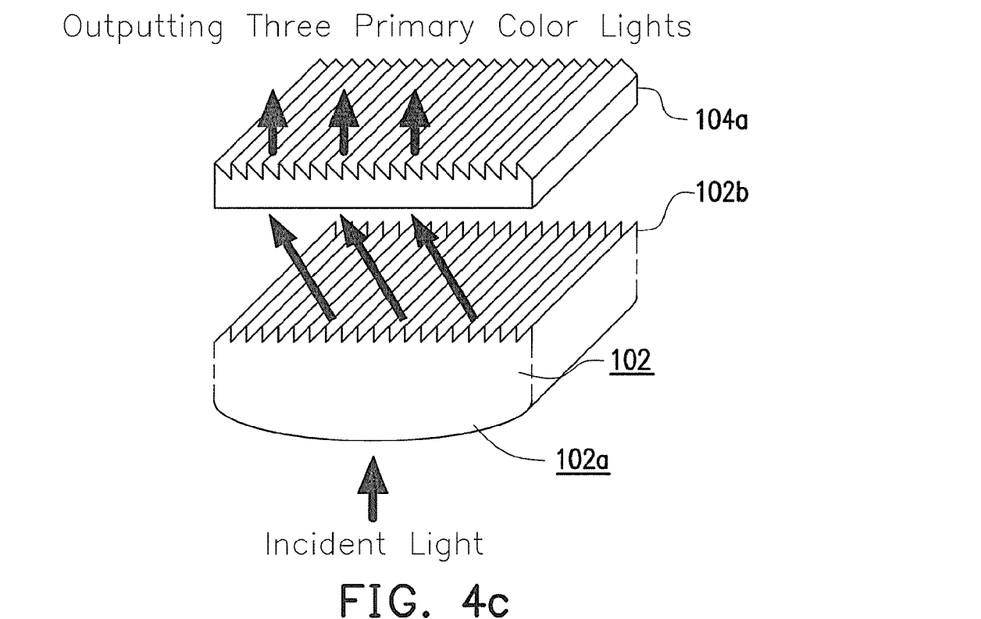
Figure 4D:
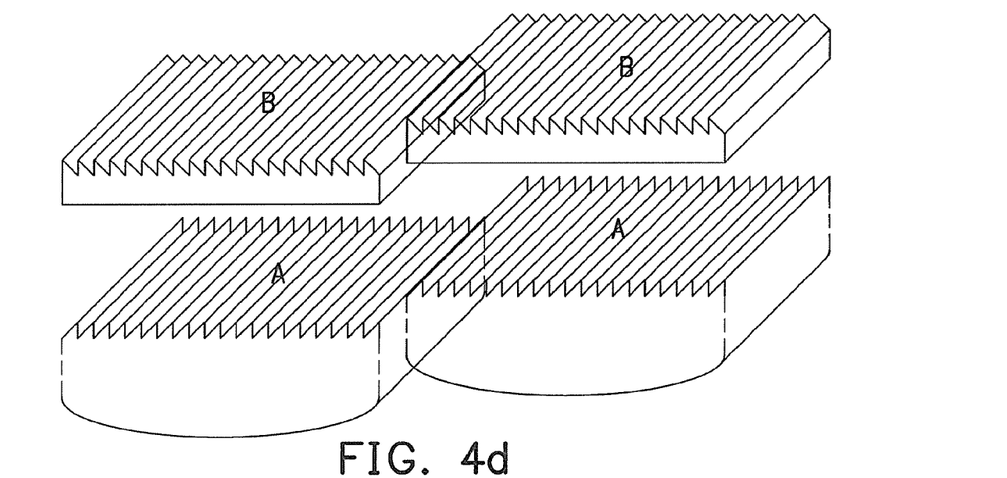
Figure 4E:
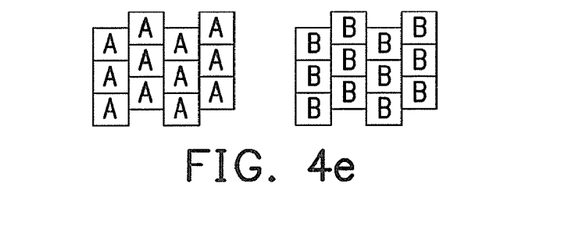
Figure 5C:
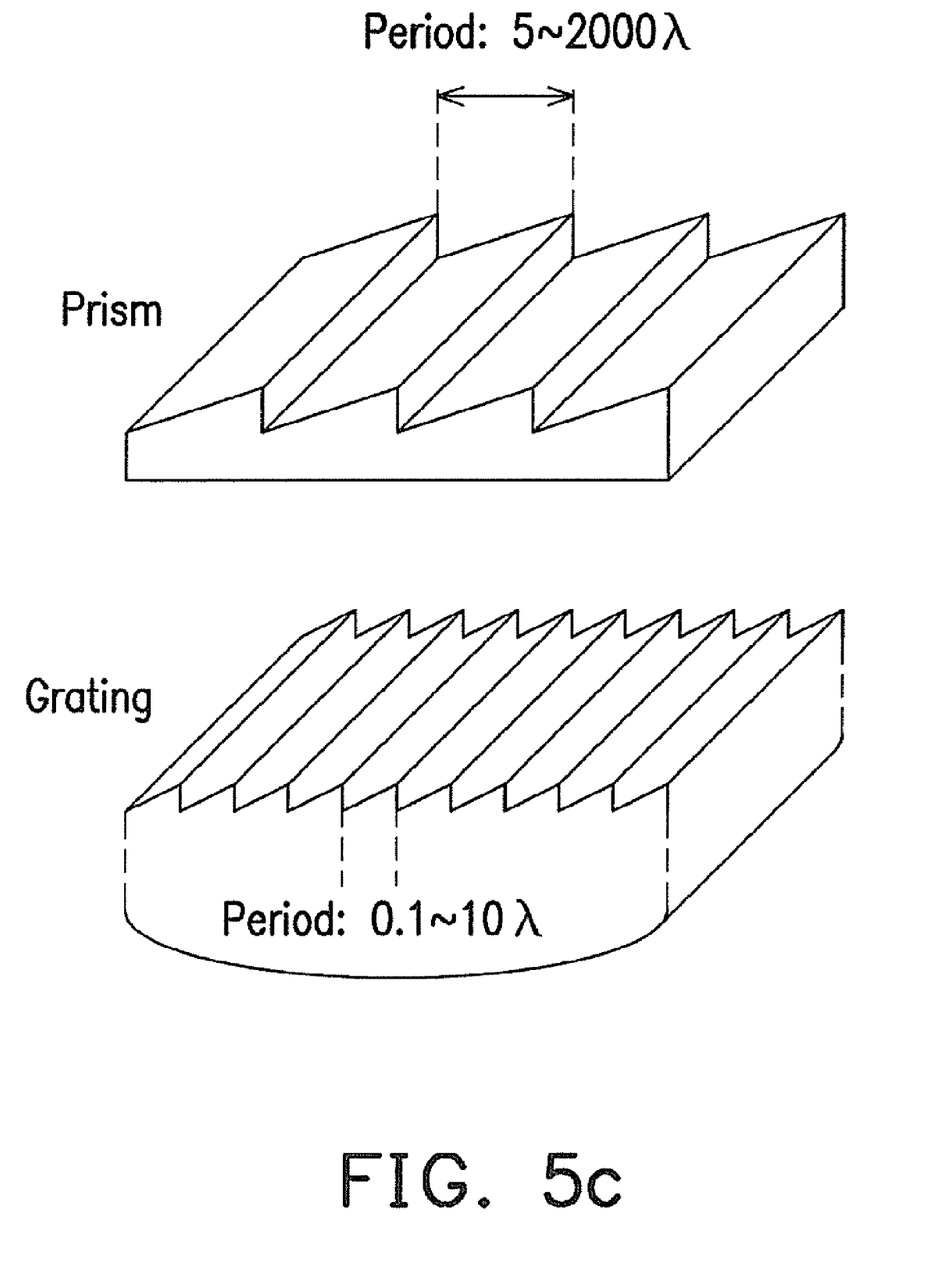

Further, each of the micro-lenses of the refracting/diffracting unit can be a convex lens having a positive curvature. The periodic structure of the micro-lenses can be a one-dimensional array of cylindrical lenses, or a two-dimensional array of lenses. The period of the micro-lenses is within the range of 5 to 2000 λ. The one-dimensional structure and the two-dimensional structure in perspective views are further shown in FIGS. 4*c*-4*e* and FIG. 5*c*. In FIG. 4*c*, the refracting/diffracting unit 102 is just in a one-dimensional cylindrical array of lenses while the size in prism or grating manner is shown in FIG. 5*c*. In FIG.4*d* and FIG. 4*e*, several refracting/diffracting units, denoted by A, are arranged as a two-dimensional array of lenses, in which the adjacent two refracting/diffracting units have a relative shift in locations. In addition, several refracting structure units. denoted by B, are at the locations corresponding to refracting/diffracting units A.

Further, the periodic grating structure of the refracting/diffracting unit for example can be a polygonal structure or a wedge structure. The periodic grating structure can be a one-dimensional or two-dimensional blazed grating, multi-stage grating, or sub-wavelength grating. The period of the periodic grating structure is within the range of 0.1 to 10 λ, as shown in FIG. 5*c*.

Further, both of the periodic grating structure of the refracting/diffracting unit and the refracting structure of the refracting unit can be grating structures. A distance therebetween can be varied, for example within a range of 0.1 mm to 30 mm, for in cooperating with the light dividing angles defined by the grating structures to maintain the different waveband lights to output with a specific spacing interval.

Further, the light beam incident to the composite light dividing device for example can be a polarizing light beam, or a non-polarizing light beam.

Further, the refracting structure of the refracting unit for example can be a polygonal grating structure or a wedge grating structure. The refracting structure can be a periodic one-dimensional or two-dimensional blazed grating, multi-stage grating, or sub-wavelength grating. The period of the grating structure is within the range of 0.1 to 10 λ.

Further, the refracting structure of the refracting unit for example can be a polygonal refracting structure. The refracting structure can be a periodically one-dimensional array or two-dimensional array of prisms. The size of the prisms is within the range of 5 to 2000 λ as shown in FIG. 5c.

Furthermore, one or both of the refracting/diffracting unit and refracting unit can be made of a polarization material. Further, for example, a polarization material layer can be disposed between the periodic grating structure of the refracting/diffracting unit and the refracting unit. Further, for example, a polarization material layer can be disposed in front of the refracting/diffracting unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A composite light dividing device, receiving a light beam mixed by lights of a plurality of wavebands, the composite light dividing device comprising:
   a refracting/diffracting unit, having a first surface and a second surface opposite to the first surface, the refracting/diffracting unit comprising:
      a plurality of micro-lenses configured on the first surface for condensing the received light beam into a condensed light beam; and
      a periodical grating structure configured on the second surface, for dividing the condensed light beam at a deflection direction; and
   a refracting unit comprising a refracting structure, for deflecting the divided condensed light beam to output at a specific direction.

2. The composite light dividing device according to claim 1, wherein the light beam comprises lights of red, green, and blue wavebands.

3. The composite light dividing device according to claim 1, wherein the refracting structure of the refracting unit is a one-dimensional or a two-dimensional refracting structure.

4. The composite light dividing device according to claim 3, wherein the refracting structure of the refracting unit is a grating structure having a period within a range of 0.1 to 10 λ.

5. The composite light dividing device according to claim 3, wherein the refracting structure of the refracting unit is a prism structure having a period within a range of 5 to 2000 λ.

6. The composite light dividing device according to claim 1, wherein the refracting structure further comprises a refraction sub-structure in each region corresponding to each of the waveband lights.

7. The composite light dividing device according to claim 1, wherein the refracting/diffracting unit is made of a polarization material.

8. The composite light dividing device according to claim 1, wherein the refracting unit is made of a polarization material.

9. The composite light dividing device according to claim 1, further comprising a polarization layer disposed in front of the refracting/diffracting unit, so that the light beam enters the polarization layer before entering the refracting/diffracting unit.

10. The composite light dividing device according to claim 1, further comprising a polarization layer disposed between the refracting/diffracting unit and the refracting unit, so that the divided lights of the wavebands enter the polarization layer before entering the refracting unit.

11. The composite light dividing device according to claim 1, wherein a period and a structure of the periodic grating structure of the refracting/diffracting unit are different from those of the refracting structure of the refracting unit, or at least one of the period and the structure of the periodic grating structure of the refracting/diffracting unit is equivalent to that of the refracting structure of the refracting unit.

12. The composite light dividing device according to claim 1, wherein the micro-lenses of the refracting/diffracting unit are micro diffraction lenses having a same shape, and the micro diffraction lenses are condensing micro diffraction lenses.

13. The composite light dividing device according to claim 1, wherein the micro-lenses of the refracting/diffracting unit are periodically arranged convex lenses having a positive curvature and a period within a range of 5 to 2000 λ.

14. The composite light dividing device according to claim 13, wherein the micro-lenses of the refracting/diffracting unit are a one-dimensional array of cylindrical lenses or a two-dimensional array of lenses.

15. The composite light dividing device according to claim 1, wherein the periodic grating structure of the refracting/diffracting unit is a polygonal structure or a wedge structure.

16. The composite light dividing device according to claim 1, wherein the periodic grating structure of the refracting/diffracting unit is a one-dimensional grating structure or a two-dimensional grating structure having a period within a range of 0.1 to 10 λ.

17. The composite light dividing device according to claim 1, wherein the refracting structure of the refracting unit is configured at an incident end of the refracting unit from where the divided lights of the wavebands enter the refracting unit, or at an output end of the refracting unit from where the divided lights of the wavebands are outputted from the refracting unit.

18. The composite light dividing device according to claim 1, wherein an output direction of the divided lights of the wavebands configures an angle with an incident direction of the light beam, the angle ranging from 0° to 60°.

19. The composite light dividing device according to claim 1, wherein a distance from the second surface of the refracting/diffracting unit to the refracting unit is within a range of 0.1 mm to 30 mm.

20. The composite light dividing device according to claim 1, wherein the light beam incident to the composite light dividing device is a polarizing light beam, or a non-polarizing light beam.

21. The composite light dividing device according to claim 1, wherein air or a transparent material layer is provided between the refracting/diffracting unit and the refracting unit.

* * * * *